(12) United States Patent
Trajkovic et al.

(10) Patent No.: US 7,218,289 B2
(45) Date of Patent: May 15, 2007

(54) PORTABLE HIGH-SPEED DATA AND BROADCAST-QUALITY VIDEO TERMINAL FOR TERRESTRIAL AND SATELLITE COMMUNICATIONS

(75) Inventors: Sasa Trajko Trajkovic, Burnaby (CA); Petrus Bezuidenhout, Port Coquitlam (CA); Michael John Schefter, Vancouver (CA); Pervez Rafique Siddiqui, Vancouver (CA); Glen Allan Dwornik, New Westminster (CA); Leonard Albert Russell, Delta (CA)

(73) Assignee: Norsat International Inc. (CA)

( * ) Notice: Subject to any disclaimer, the term of this patent is extended or adjusted under 35 U.S.C. 154(b) by 25 days.

(21) Appl. No.: 11/220,549

(22) Filed: Sep. 8, 2005

(65) Prior Publication Data

US 2007/0052612 A1    Mar. 8, 2007

(51) Int. Cl.
*H01Q 3/02* (2006.01)
(52) U.S. Cl. .................. 343/882; 343/880; 343/757
(58) Field of Classification Search .............. 343/757, 343/765, 880, 882
See application file for complete search history.

(56) References Cited

U.S. PATENT DOCUMENTS

| | | | | |
|---|---|---|---|---|
| 4,998,114 A | * | 3/1991 | Eto et al. | 343/840 |
| 5,019,833 A | * | 5/1991 | Nonaka | 343/840 |
| 5,334,990 A | * | 8/1994 | Robinson | 343/840 |
| 5,760,751 A | * | 6/1998 | Gipson | 343/880 |
| 6,462,718 B1 | * | 10/2002 | Ehrenberg et al. | 343/880 |
| 2004/0196207 A1 | * | 10/2004 | Schefter et al. | 343/878 |

* cited by examiner

*Primary Examiner*—Hoang V. Nguyen
(74) *Attorney, Agent, or Firm*—Vermetle & Co.

(57) ABSTRACT

A high-performance portable microwave communication unit, consists of a directional antenna, RF transceiver and high-speed data/video processing unit for use in terrestrial point-to-point communications or as a ground station in a satellite communication system. For transportation, the unit is disassembled, folded down and stowed in two airline-checkable hard-shell cases. Each case can be equipped with shoulder straps such that it can be carried like a backpack, a set of wheels so it can be rolled, attached to a MOLLE frame so that it can be carried as a backpack and which allows attachment of accessories. The cases and their interiors have been designed to provide protection for the communication unit, while the construction of the unit itself involves novel mechanical features that allow for compact stowage as well as for rapid disassembly and assembly.

8 Claims, 15 Drawing Sheets

PORTABLE HIGH-SPEED DATA AND BROADCAST-QUALITY VIDEO TERMINAL FOR TERRESTRIAL AND SATELLITE COMMUNICATIONS

FIELD OF THE INVENTION

The invention relates to a portable communications system for high-speed data and video transmission.

BACKGROUND TO THE INVENTION

Due to the high performance demands, Satellite News Gathering (SNG) systems, systems for logging and transmitting data from remote exploration sites, certain portable military communication systems, and other systems using transmission of high bit rate data require large parabolic antennas, high-power RF amplifiers and complex electronics, and therefore are relatively large.

Prior art portable communications systems require relatively large containers or cases that allow for only short manual handling between transportation between vehicles. One of the best-packaged systems of this type, using only one (25"×24.5"×16") suitcase is described in U.S. Pat. No. 5,633,891. Such a suitcase cannot be checked onto an airplane with regular luggage. More compact systems exist, (e.g. European Patents EP1440612 and EP1380123) however, they are not very robust and are inconvenient to transport. They are therefore inappropriate for many applications, such as SNG and military applications.

Also known in the prior art are "wearable" communication systems. Such systems usually have their electronics permanently stowed in a backpack-type container. However, such systems (e.g. U.S. Pat. No. 5,864,481 and US patent applications 20040088780 and 20040113836) are used for specialized military purposes, requiring electronics operating at lower frequencies and small antennas, (e.g. personal protection devices, location beacons, etc.). Such systems are totally inadequate for applications requiring transmission of data at high bit rates.

More generally, the prior art also includes "convertible" luggage systems that can be used either as a suitcase, backpack, and/or a wheeled suitcase (e.g. U.S. Pat. Nos. 5,749,503; 6,742,684; and 6,530,507). However, these do not provide any protection for sensitive communications equipment. Specifically, such prior art systems do not provide for a hard shell case necessary to protect communications equipment.

Accordingly, the present invention addresses the above drawbacks of the prior art by providing a novel mechanical design of the communication unit and containment system, resulting in a rugged and portable high performance system for high speed data and/or video communications.

SUMMARY OF THE INVENTION

This invention is an easily transportable communication unit for high-speed data/video transmission via a terrestrial or satellite communication system, and a containment system therefore. For transportation, the unit can disassembled, folded down and stowed in two cases, one containing primarily the antenna and RF components and the other the baseband electronics.

In the preferred embodiment, the cases are airline-checkable hard-shell suitcases with lifting handles, ergonomically sized and shaped for human backs, and are equipped with fastening means for attachment of a soft carrying handle, shoulder and waist pads and shoulder straps, a carriage with wheels, and/or a MOLLE frame. The MOLLE frame provides greater support for the user when carrying the cases over uneven terrain for long distances. It also provides the opportunity to attach accessories as may be required in, for example, military applications.

The baseband housing for the baseband electronics and the cases have been designed to provide three levels of shock and vibration protection of the communication unit, namely:
 a) the impact resistant shells of the cases themselves;
 b) foam lining of the cases; and
 c) a shock absorber mechanism within the baseband housing for the baseband unit.

The configuration of the communication unit's parts allows for compact stowage. The large 1 meter segmented antenna and RF components are mounted on a rotatable platform to which they are preferably pivotably attached by a quick-connect assembly containing guiding pins and thumb screws. The platform is attached to the baseband housing, which is equipped with two folding "legs" that can be extended into positions such that, together with the main body of the housing, three points of support are provided. This eliminates the need for a tripod, thereby saving both space and weight. The detachable quick-connect assembly provides an excellent separation point between the antenna assembly and the baseband housing that leads to compact stowage.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE INVENTION

Referring to FIGS. 1–6, a communication unit is shown, that is capable of transmitting and receiving data and video via satellite, or terrestrial point-to-point, at speeds up to 4 Mb/s. To achieve such high performance, while preventing undue interference to or from other systems, a large (1 meter) parabolic antenna must be employed, together with a powerful RF amplifier. In the prior art this has resulted in relatively large communications systems whose portability has been limited. The innovative design of the present invention results in communication unit that is compact and that is easily transported, assembled and disassembled.

Figure 1:
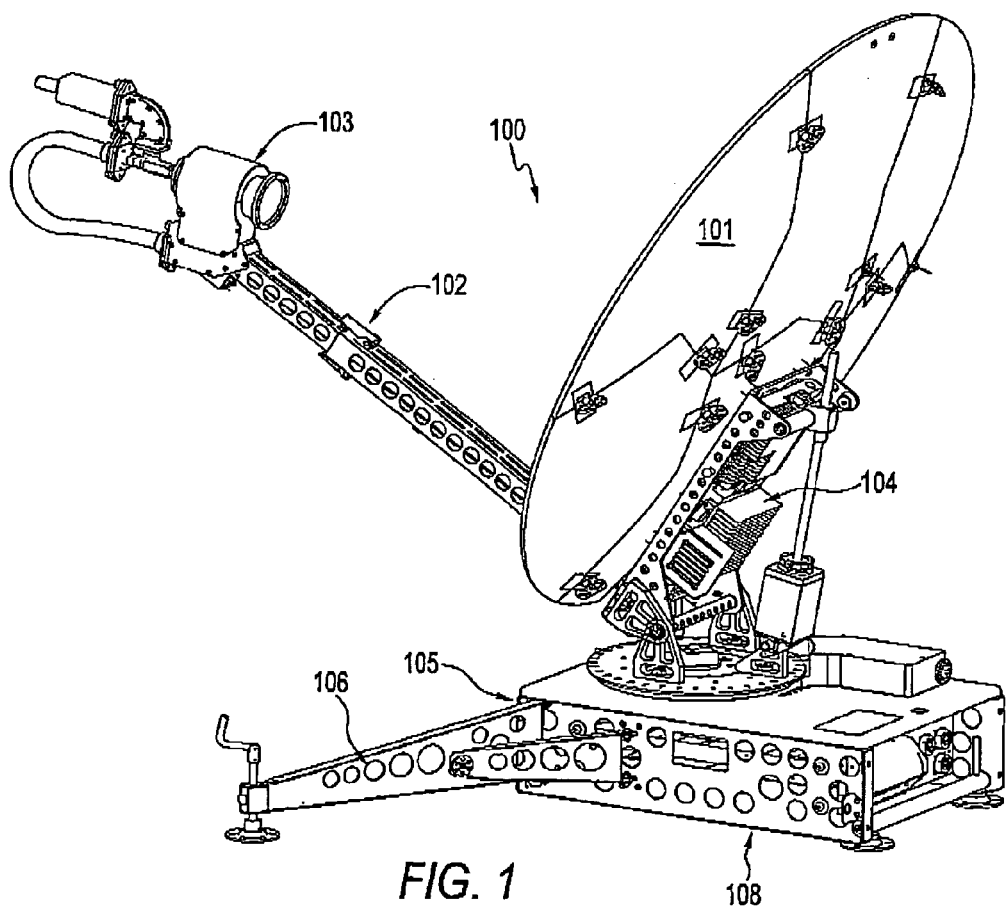
FIG. 1 shows the fully expanded, operational form of the communication unit.

As shown in FIG. 1, the communication unit 100 consists of a 1 m diameter parabolic segmented antenna 101 with a boom assembly 102 with a feed horn and receiver assembly 103 mounted on the end. The boom assembly 102 breaks into two parts for disassembly and transport. On the lower back part of the antenna 101, the RF transmit (Tx) electronics assembly 104 is mounted to a U-shaped carrier 502. When the communications unit 100 is deployed, as shown in FIG. 1, the antenna 101 and RF transmit electronics assembly 104 are mounted, (including alignment, azimuth and elevation adjustment mechanisms) on the baseband housing 105 (i.e. the housing for the "non-RF", or "baseband" (BB) electronics). The baseband housing 105 has a main body 108 and foldable legs 106, which together act as a tripod, providing a stable platform for the communication unit 100.

Figure 2:
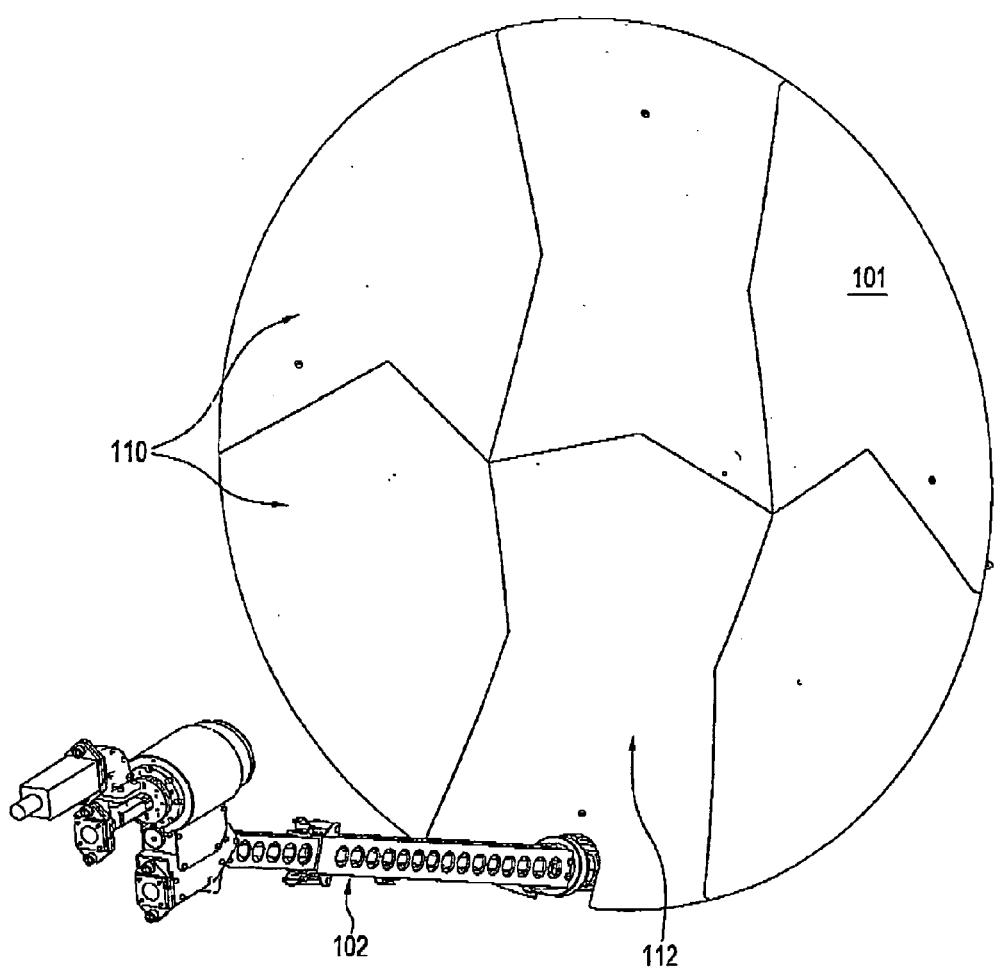
FIG. 2 shows the antenna.

Referring to FIG. 2, the antenna 101 is shown, having six segments 110. The edges and interfaces between adjacent antenna segments 110 have a unique zig-zag configuration which imparts greater rigidity, and improved RF performance, to the assembled antenna 101 as compared to prior art antennas and reflectors. The segments 110 may be fastened to one another, without use of tools, by any appropriate quick-connect means, including clasps or clamps, catches and latches, thumb screws, etc. The boom assembly 102 connects to a U-shaped carrier 502 behind the main segment 112. The antenna 101 may be made of plastic with a metallic mesh inside or any other suitable material.

Figure 3:
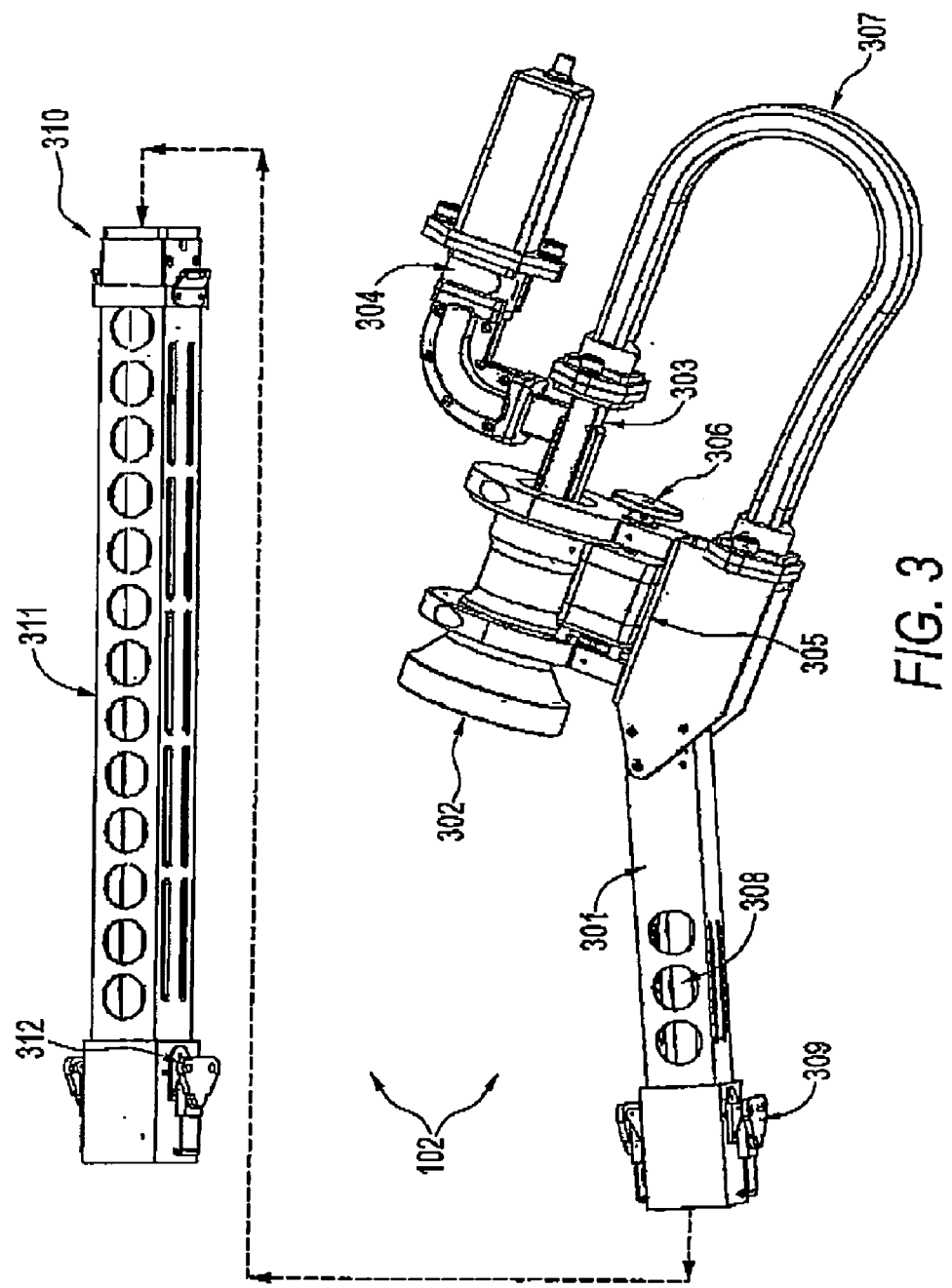
FIG. 3 shows the disassembled boom and feed assembly.

FIG. 3 shows the various components of the boom assembly 102. The boom assembly 102 consists of an upper boom arm 301 with a feed horn and receiver assembly 103 consisting of feed 302, Transmit/Receive separator (OMT) 303 and receiver (LNB) with Transmit Reject Filter (TRF) 304. The feed 302, OMT 303 and LNB with TRF 304 are rotatable for polarization alignment by motor and gear 305, or with manual override 306. The Transmit port of the OMT 303 is connected, via flexible waveguide 307, using quick-connect interface, to solid waveguide 308 running inside the upper boom arm 301. The upper boom arm 301 is terminated with a quick connect device 309 which engages a complementary quick connect device on lower boom arm 311. When the upper and lower boom arms 301 and 311 are connected, the solid waveguide 308 connects to the waveguide flange 310 of the lower boom arm 311. The lower boom arm 311 is terminated with another quick-connect device 312 which connects to the U-shaped carrier 502 (see FIGS. 4 and 5).

Figure 4A:
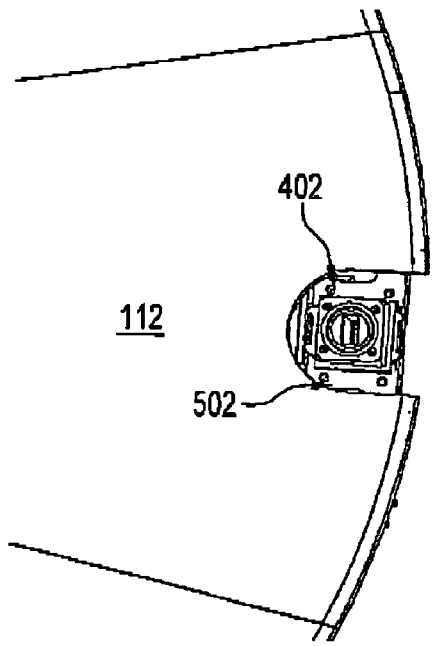
FIGS. 4(a) and 4(b) show the detail of the boom attachment.
Figure 4B:
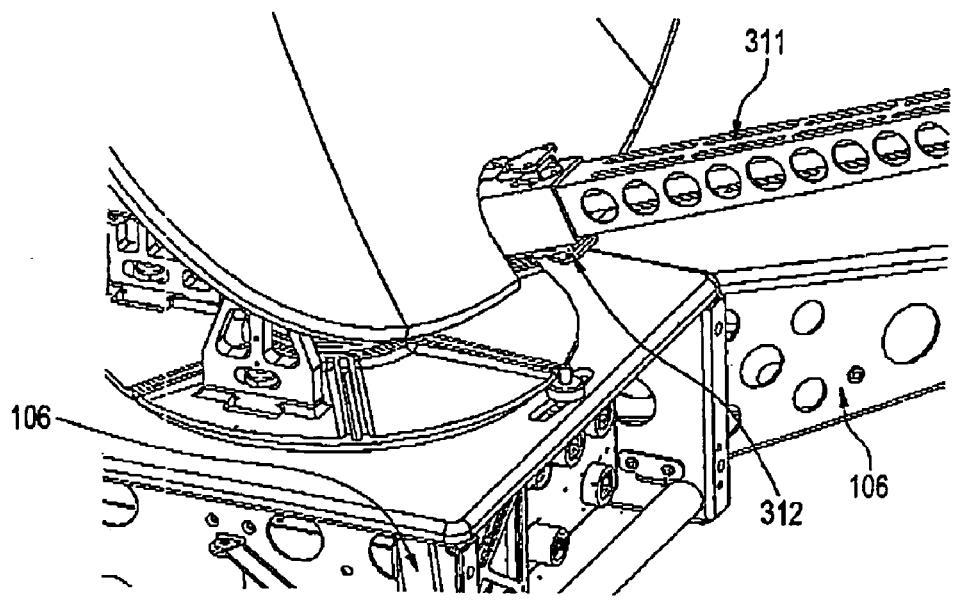

FIGS. 4(a) and 4(b) show that the quick-connect device 312 on the lower boom arm 311 attaches to the waveguide flange 402, mounted on the U-shaped carrier 502, which in turn is mounted on the main reflector segment 112.

Figure 5:
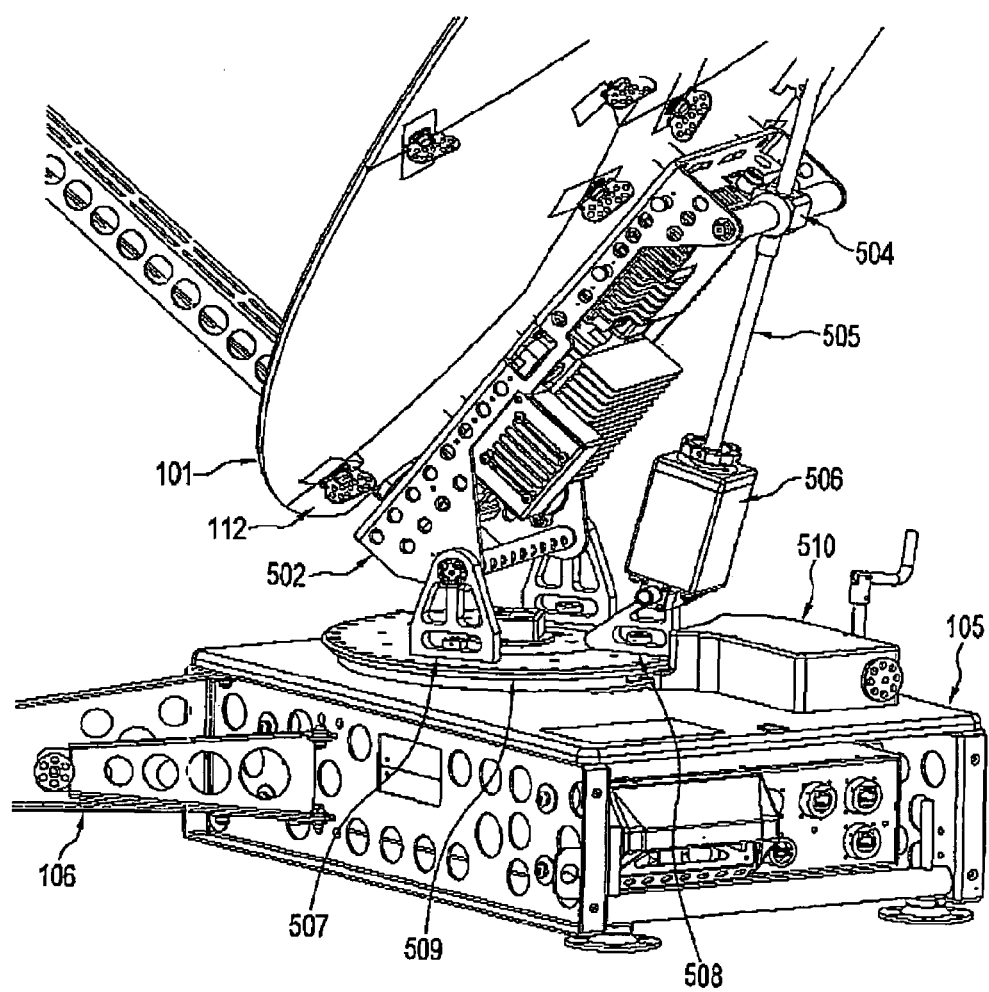
FIG. 5 is a back view of the antenna and baseband housing.

FIG. 5 shows the antenna 101 mounted to the baseband housing 105. The main reflector segment 112 is attached to the U-shaped carrier 502 to which is attached the RF transmit (Tx) electronics assembly 104. The U-shaped carrier 502 also has connected to it the elevation gear 504, with elevation rod 505 and elevation motor 506. The whole antenna assembly (antenna 101, RF transmit (Tx) electronics assembly 104, U-shaped carrier 502, elevation gear 504, elevation rod 505 and elevation motor 506) is mounted, via quick-connect assemblies 507 and 508, on rotational platform 509 for azimuth alignment, driven by azimuth motor and gear-box 510. The platform 509 and azimuth motor 510 are part of the baseband housing 105.

Figure 6:
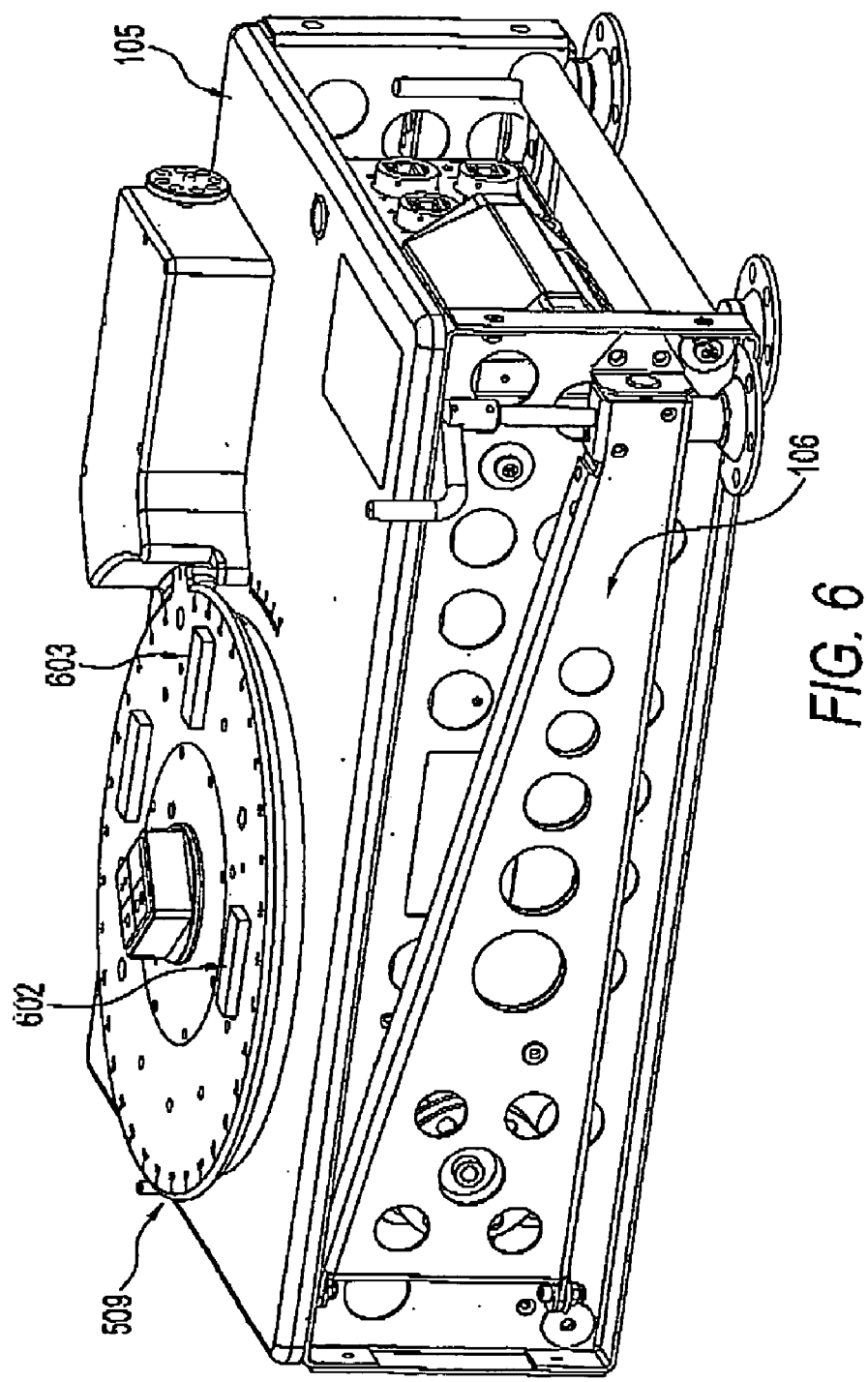
FIG. 6 shows the baseband housing in isolation with its legs folded.

FIG. 6 shows the baseband housing 105 with the legs 106 folded, after removal of the antenna assembly (not shown) from rotational platform 509. Attachment points 602 are for the attachment of the quick-connect assembly 507 (see FIG. 5). Attachment point 603 is for attaching the elevation quick-connect assembly 508 (see FIG. 5).

In the preferred embodiment the baseband housing 105 is made of metal, preferably aluminium or composite, however, any suitable material may be used.

Figure 7:
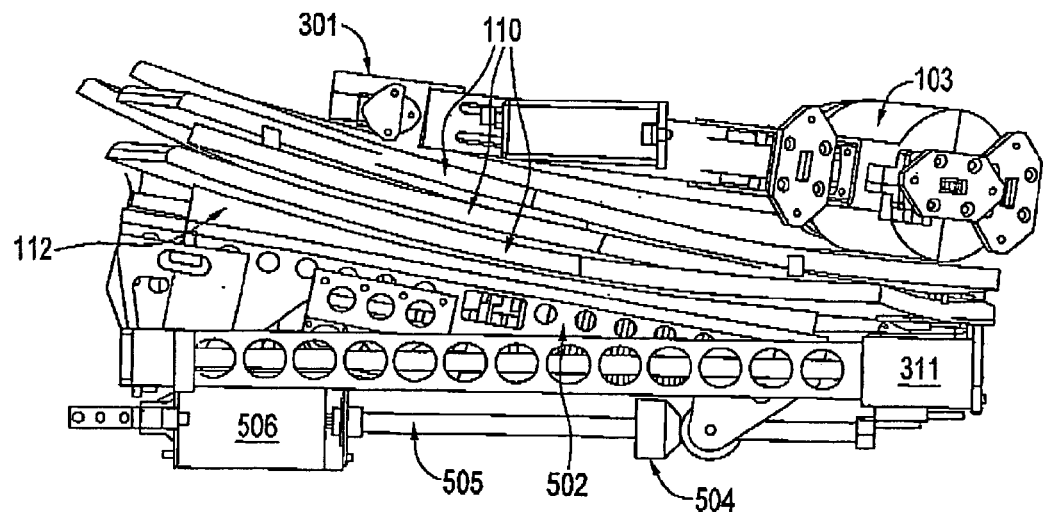
FIG. 7 shows a side cutaway view of the compacted core of the antenna/RF subsystem, showing the main segment of the antenna with the plate containing RF electronics and elevation adjust rod, 3 other segments and the two parts of the boom/feed with LNBs.

FIG. 7 shows how parts of the communication unit 100 (see FIG. 1) can be compactly arranged for storage and transport in a portable case. The main segment 112 remains attached to the U-Shaped carrier 502. The U-shaped carrier 502 encloses the RF transmit (Tx) electronics assembly 104 (not shown). Also attached to the U-shaped carrier 502 are the elevation gear 504, elevation rod 505 and elevation motor 506. Three antenna segments 110 are stacked on the main segment 112. Antenna segments 110 preferably have patches of foam or rubber, or other suitable material, attached to the back, to provide separation between segments and protect them from scratching each other.

The upper boom arm 301 with the feed horn and receiver assembly 103 is shown on top of the uppermost antenna segment and the lower boom arm 311 is shown adjacent the U-Shaped carrier 502.

Figure 8:
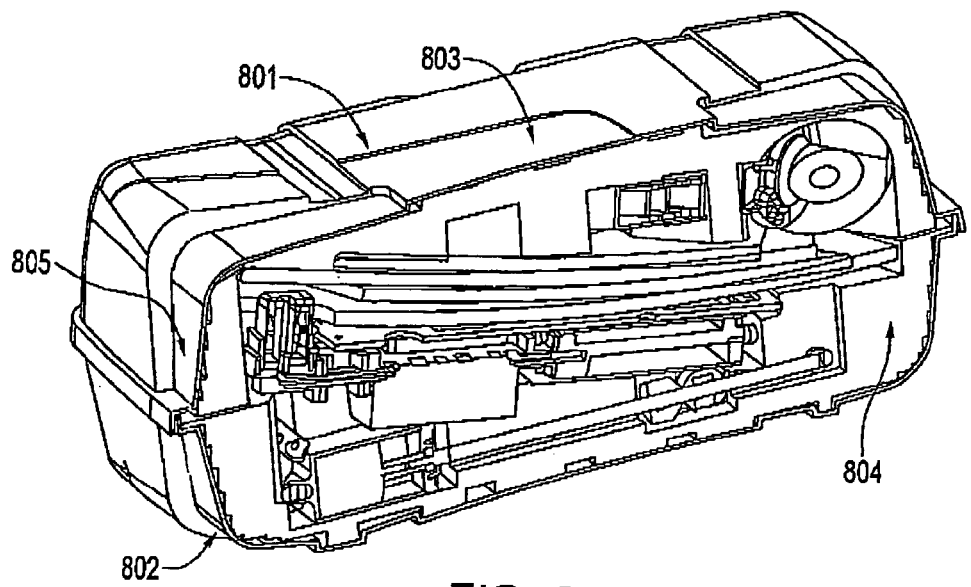
FIG. 8 shows a side cutaway view of the compacted core of the antenna/RF subsystem.

FIG. 8 shows a cut-away view of the communication unit components of FIG. 7, arranged in the same manner as described in FIG. 7, in a portable case 801. The case 801 has a bottom half 802 and top half 803. The case has an impact-resistant outer shell 805 and is filled with protective foam 804 with cut-outs for the individual components of the communication unit.

Figure 9:
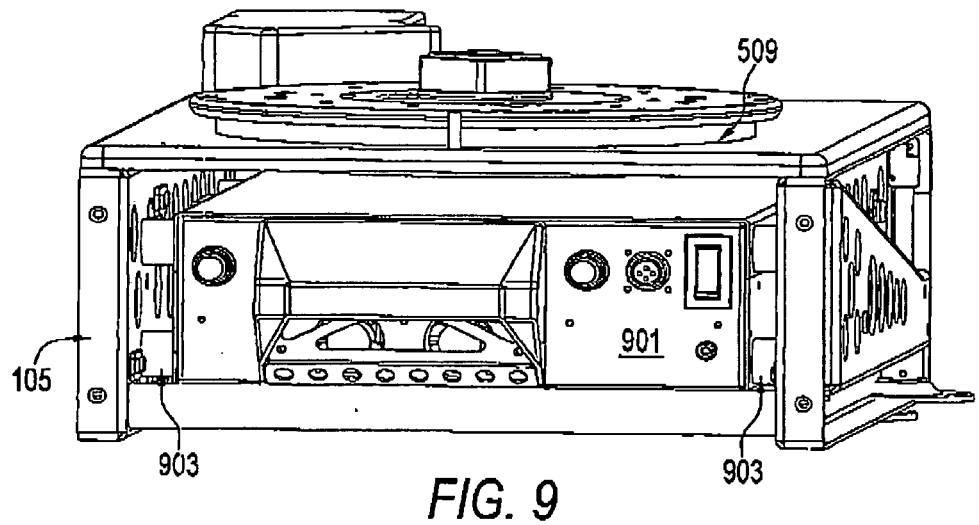
FIG. 9 shows the baseband unit within the baseband housing.

FIG. 9 shows a cut-away view of the baseband housing 105 in which the baseband unit 901 is suspended by means of 8 shock absorbers 903. The baseband unit 901 contains the components needed to process data to and from a laptop computer or similar device into form suitable for the RF transmit (Tx) electronics assembly 104 and the feed horn and receiver assembly (see FIGS. 1–5).

Figure 10:
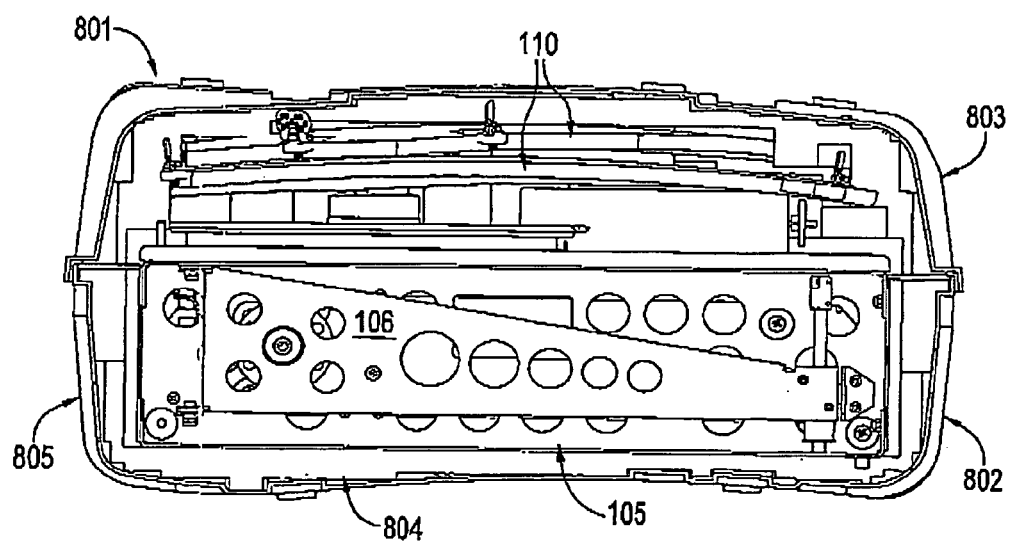
FIG. 10 shows the baseband housing with two antenna segments enclosed in the baseband case with protective foam.

FIG. 10 shows a cut-away view of a portable case 801 containing the baseband housing 105 and the remaining two antenna segments 110. The case 801 is filled with protective foam 804, which surrounds the baseband housing 105 and antenna segments 110, providing shock and vibration protection. Therefore, during transportation, the baseband unit 901 (see FIG. 9) is protected from shock and vibration by impact-resistant outer shell 805, the protective foam 804 and the shock absorbers 903 (see FIG. 9).

Referring to FIGS. 1–10, to disassemble the communication unit 100 for storage and transport, the boom assembly 102 is detached separated into two parts and the antenna segments 110 are separated. The main segment 112 with U-shaped carrier 502, RF transmit (Tx) electronics assembly 104, elevation gear 504, with elevation rod 505 and elevation motor 506 are removed from the rotatable platform 509, folded down and placed in one case 801 together with 3 antenna segments 110 and the boom assembly 102. The baseband housing 105 with its legs 106 folded is placed into the other case 801 with the 2 remaining antenna segments 110.

In the preferred embodiments the communications unit 100 has a 24V DC input for connection to a vehicle battery or generator, for example. Alternatively, or in addition, the communications unit 100 may be powered by 110/220 V AC.

Figure 11:
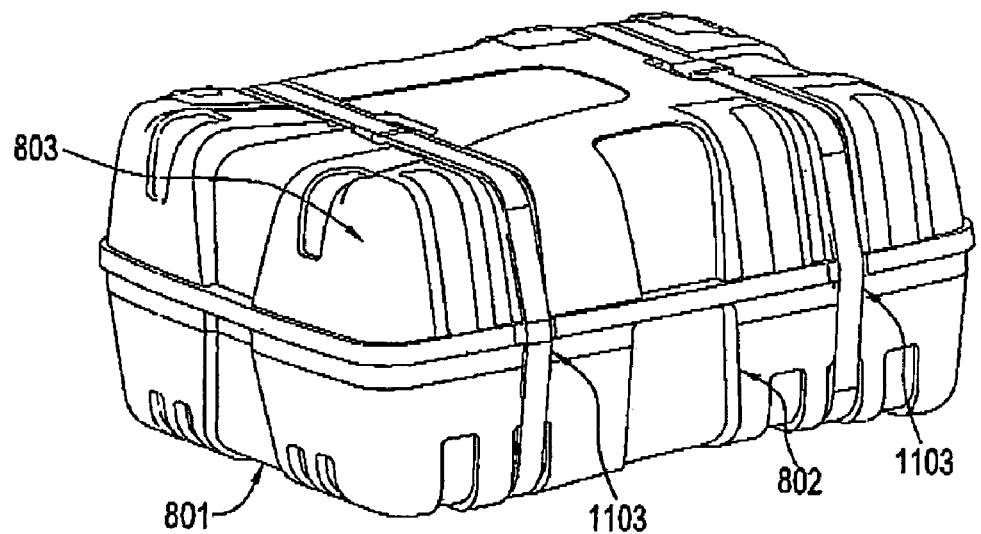
FIG. 11 shows a three-quarter view of one of the cases, closed and secured with straps.

FIG. 11 shows the external view of the case 801 with the two parts 802 and 803 of the case 801 closed together and secured with straps 1103. The external surface of the case has channels through which the straps 1103 pass. The bottom surface of the case 801 is ergonomically shaped for greater comfort when the case 801 is worn as a backpack, either with shoulder straps attached directly to the case 801 or with a MOLLE frame (see below).

Figure 12:
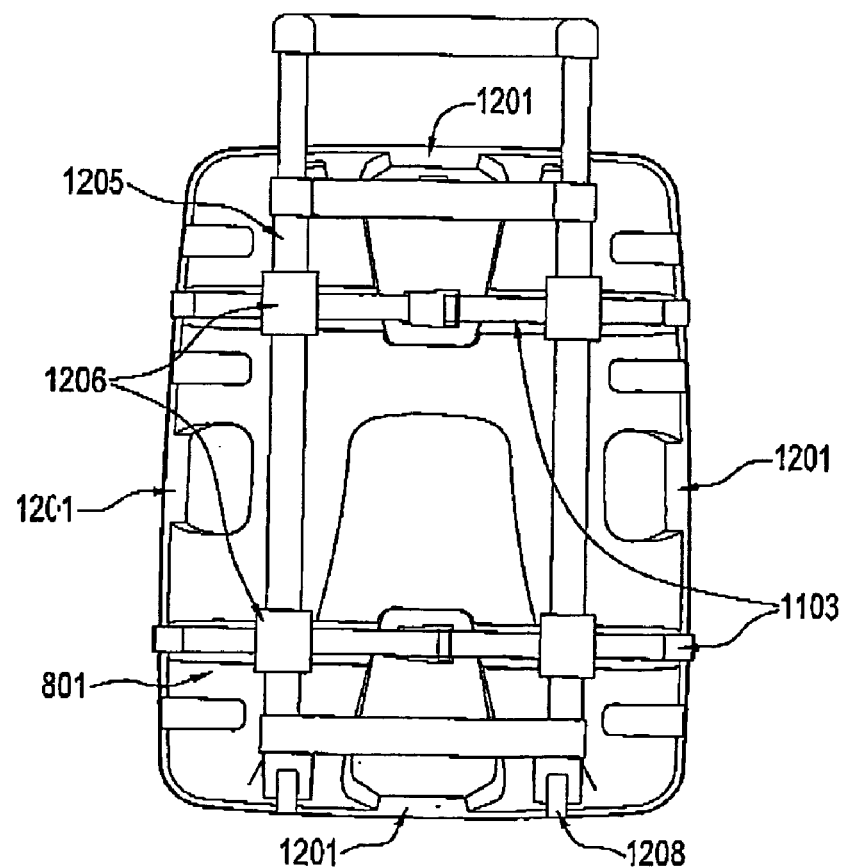
FIG. 12 shows a front view of one of the cases with an attached carriage and wheels.

FIG. 12 shows the front (or top) view of the case 801 indicating the location of the lifting handles 1201. The case 801 is shown mounted on a carriage 1205 with wheels 1208. The carriage 1205 is connected to the case 801 by straps 1103. The frame of the carriage 1205 can simply pass under the straps 1103 or, as shown in the Figure, the straps can pass through loops 1206 on the carriage.

Figure 13:
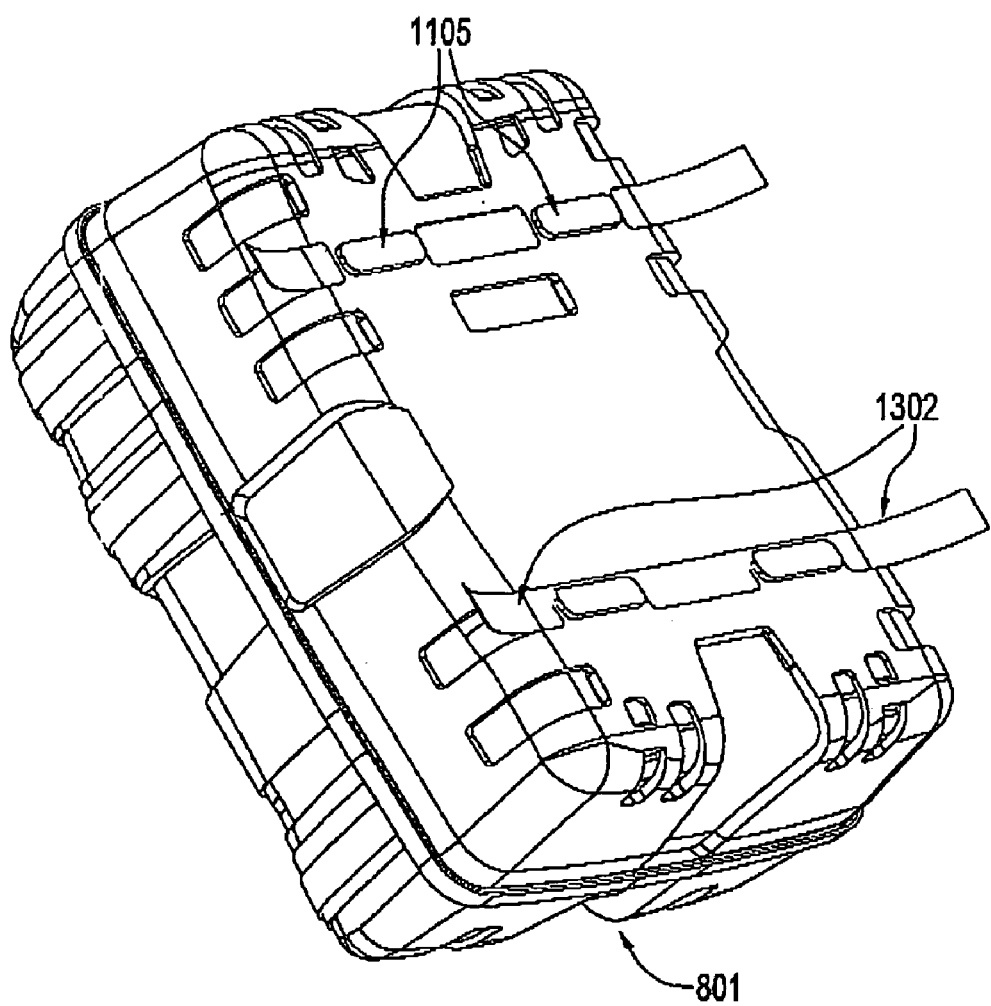
FIG. 13 shows the case and attachment points for the MOLLE frame.
Figure 14:
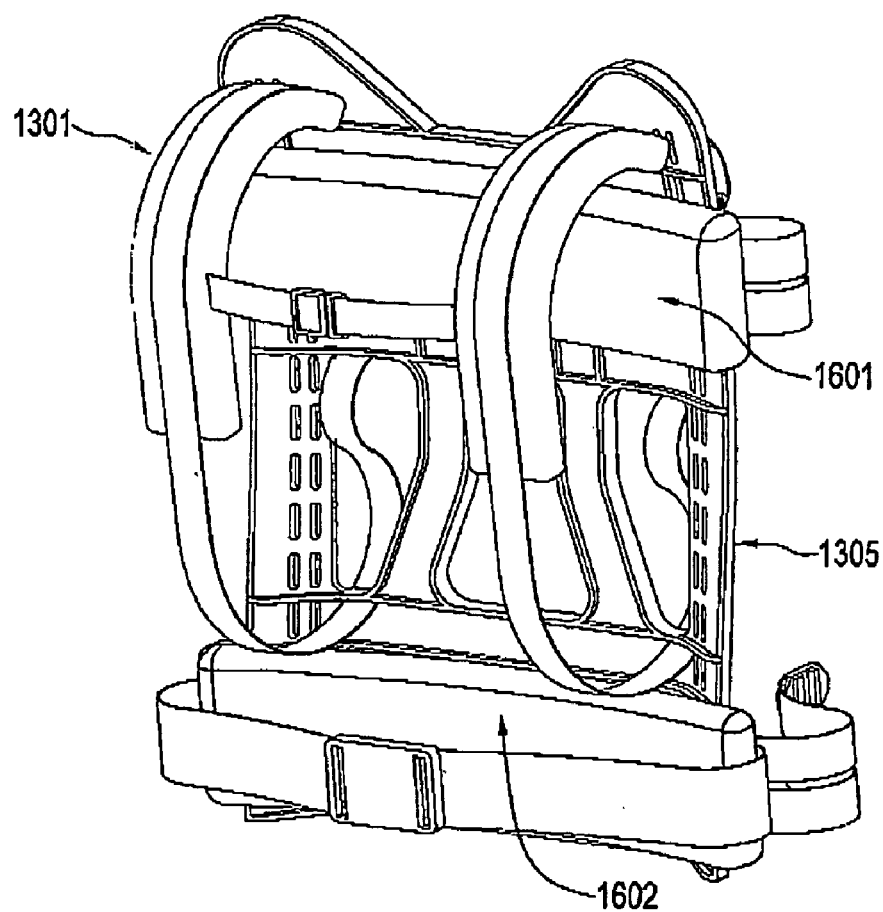
FIG. 14 shows the MOLLE frame.
Figure 15:
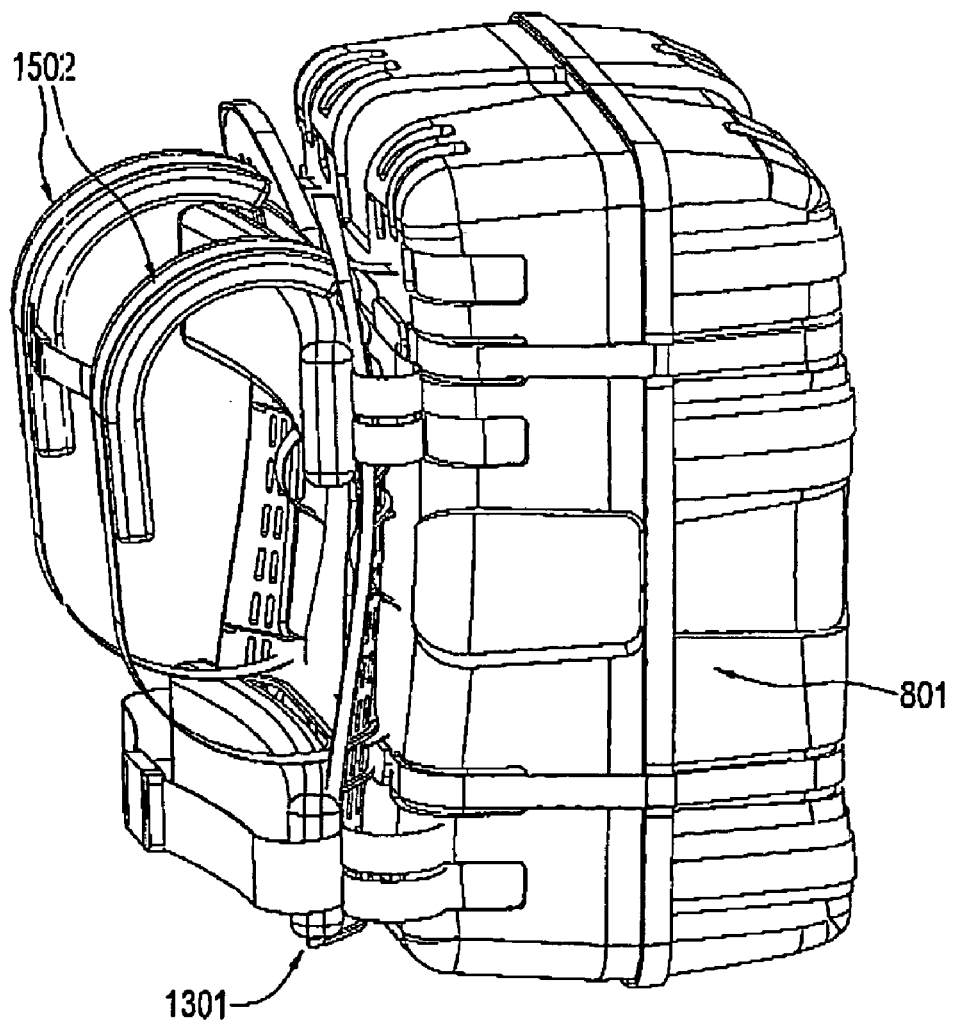
FIG. 15 shows the case attached to the MOLLE frame.

FIGS. 13–15 demonstrate the attachment of the case 801 to a MOLLE frame 1301. Straps 1302 are passed through the backside of the MOLLE frame 1301 and, together with case-securing straps 1103, (see FIG. 11) through the slots 1105 on case 801.

In an alternative embodiment, the MOLLE frame 1301 may be connected to the case 801 by passing the case-securing straps 1103 through the frame portion 1305 of the MOLLE frame 1301. The straps 1103 would also pass through slots 1105 in the shell of the case 801 as they normally do to secure the two halves of the case together. In the preferred embodiment the slots 1105 are positioned so that the straps 1103 are directly behind the shoulder 1601 and waist 1602 pads of the MOLLE frame 1301.

In the preferred embodiment the case 801 is attached to the MOLLE frame 1301 at points corresponding approximately to the shoulder and waist level of a person carrying the case 801 on their back.

FIG. 15 shows a side view of the case 801, mounted on the MOLLE frame 1301. Referring to FIGS. 13–15, in the preferred embodiment the MOLLE frame 1301 has shoulder pads 1601, waist pads 1602 and shoulder straps 1502. The MOLLE frame 1301 also includes attachment points for tools and accessories and, therefore, is especially useful in military and outdoor applications.

Due to the size, weight and hard exterior of the case 801, it is preferable to use the MOLLE frame when carrying the case 801 over uneven terrain and/or for long distances.

Figure 16A:
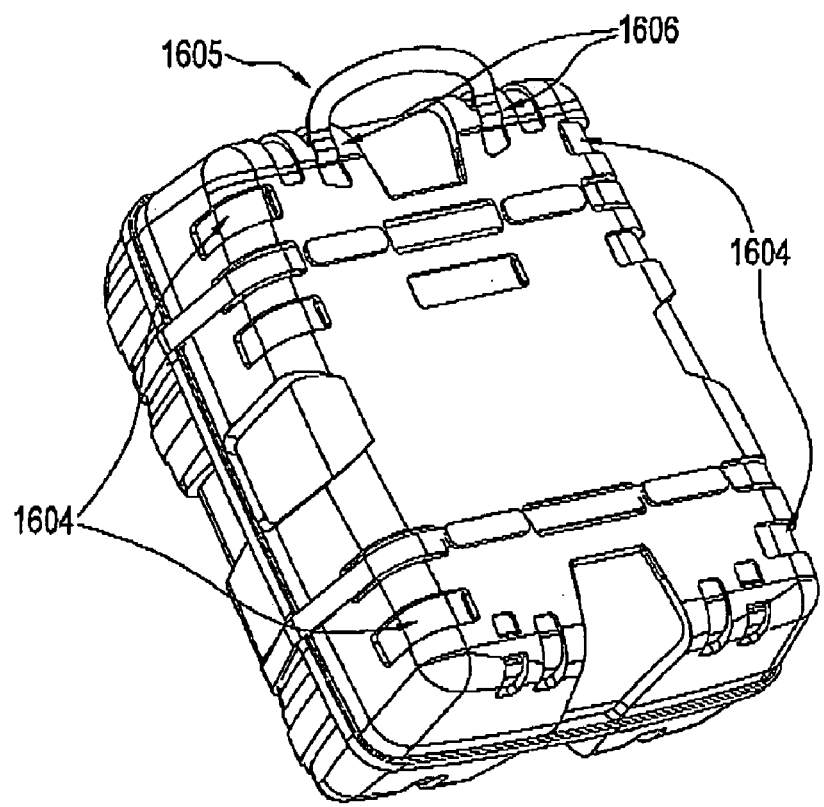
FIGS. 16(a) and 16(b) show the attachment of shoulder and waist pads and a soft carrying handle to the case.
Figure 16B:
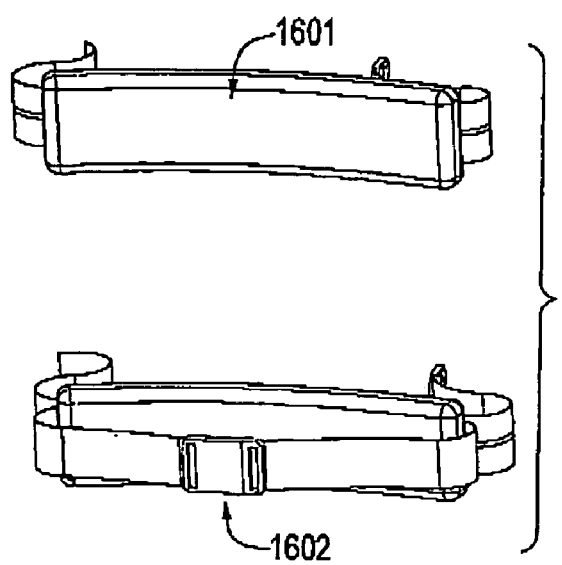
Figure 17A:
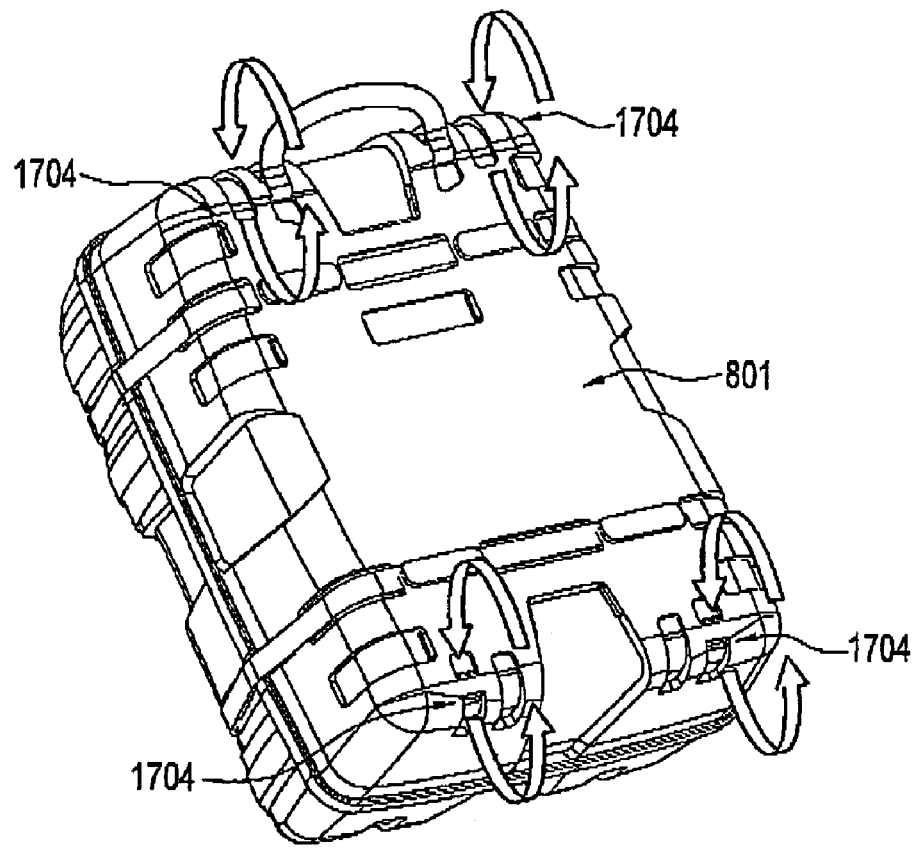
FIGS. 17(a) and 17(b) show the attachment of shoulder straps and a soft carrying handle to the case.
Figure 17B:
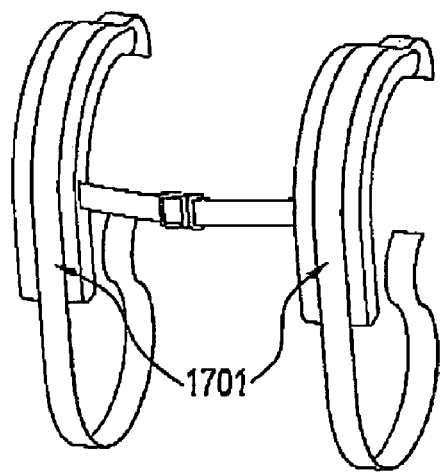

FIGS. 16(a) and 16(b) show an alternate embodiment of the case 801 having additional slots 1604 (in addition to slots 1105, see FIG. 13). The shoulder and waist pads 1601, 1602 are attached to the case 801 by passing the straps of the shoulder and waist pads 1601, 1602 through slots 1105 and 1604. The conversion into a backpack is completed by adding the shoulder straps 1701 as shown in FIGS. 17(a) and 17(b). The ends of the shoulder straps 1701 are attached to case 801 by passing the strap ends through slots 1704. Once the shoulder straps 1701 and the shoulder and waist pads 1601, 1602 are attached to the case 801, the case 801 can be carried as a backpack (however, without a MOLLE frame, in contrast to the embodiment of FIGS. 13–15). A soft carrying handle 1605 may also be attached to the case 801 by passing the ends thereof through slots 1606. This handle 1605 is intended for short handling before the case 801 is worn as a backpack.

Figure 18:
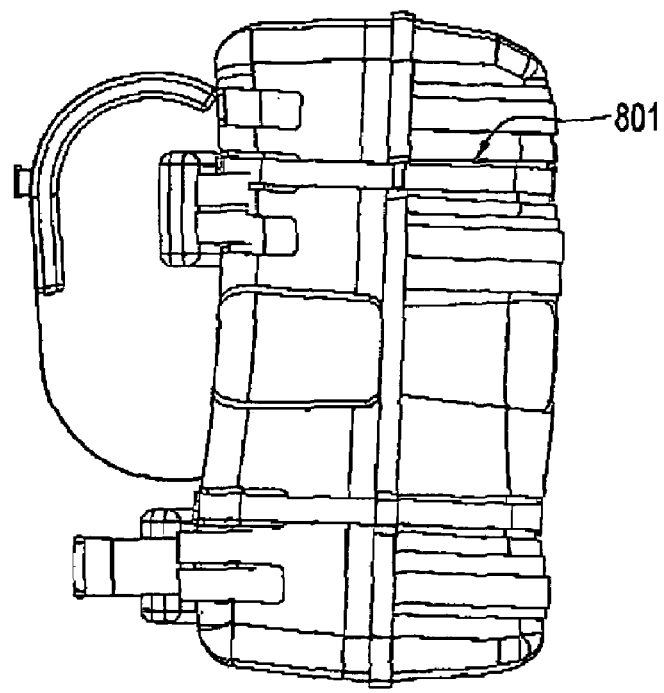
FIG. 18 shows a side view of the case with shoulder and waist pads and shoulder straps.
Figure 19:
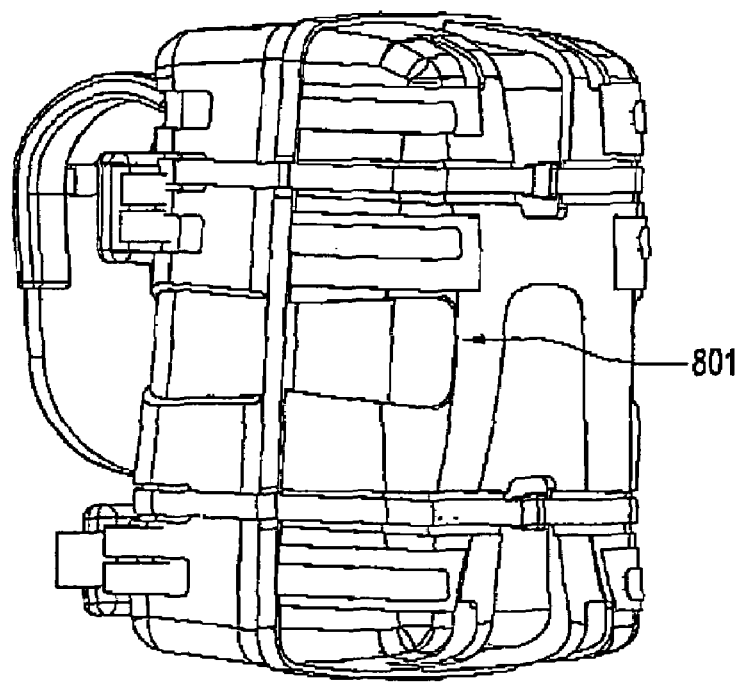
FIG. 19 shows a three-quarter view of the case with shoulder and waist pads and shoulder straps.

FIGS. 18 and 19 show side and three-quarter views of the case 801 with the shoulder straps 1701, waist pads 1602 and shoulder pads 1601 attached.

In the preferred embodiments of the invention the cases 801 are made of any suitable flexible, impact-resistant material which is relatively light and resistant to UV, mildew and corrosion.

Referring to FIGS. 12–19, the preferred means for fastening the shoulder straps 1701, shoulder and waist pads 1601, 1602, the MOLLE frame 1301, the wheeled carriage 1205 and the soft handle 1605 to the case 801 is by straps passed through slots 1105, 1704, 1604 in the shell of the case 801. However, alternate fastening means may be used. Several alternate fastening means will be readily apparent to persons skilled in the art. For example, the case 801 may have threaded holes in its outer shell operative to receive screws, so that the shoulder straps 1701, shoulder and waist pads 1601, 1602, the MOLLE frame 1301, the wheeled carriage 1205 and/or the soft handle 1605 can be screwed to the case 801. Further examples of alternate fastening means include Velcro and/or any of a number of quick release mechanisms.

Greater size, space and weight savings, versatility and protection of the communications unit is achieved with the present invention, where the case 801 can be attached to a carriage 1205, MOLLE frame 1301 and/or backpack pads 1601, 1602 and straps 1701.

In an alternate embodiment of the case 801, portions of the outer shell 805 at one end of the case 801 are cut out and wheels are mounted so that they form an integral part of the case 801. A soft handle 1605 is fastened to the case 801 at the other end as shown in FIGS. 17, 17(a) and 18, so that the case 801 can be wheeled along in a manner similar to the embodiment of FIG. 12.

Although the embodiment of case 801 described throughout this application has two halves 802 and 803, it will be readily apparent to persons skilled in the art that many alternate embodiments of the case will fall within the scope of the invention. For example, rather than comprising two halves, the case 801 could have a hollow "container" portion and a lid. Further, the lid and the hollow "container" portion may be connected by a hinge (the two halves 802 and 803 of the preferred embodiment may also be connected by a hinge).

The invention, as described above in detail, contains novel features both in the communication unit itself, as well as in the packaging for stowage and transportation. In case of the former, they include the shape and configuration of the antenna segments, the two-part boom/feed assembly with quick-connect devices, the RF carrier hinged design, the integration of the azimuth alignment motorized platform with the baseband housing, the baseband housing with foldable legs for tripod-like stability and the shock absorbers for the BB unit itself, all of which cooperate to form a communications system that can be stowed in two airline checkable cases. In case of the latter, the novel features include the hard-shell cases, which are capable of being used as an airline checkable suitcase, as a wheeled case, as a backpack mounted on a MOLLE frame, as a backpack without the MOLLE frame.

The novel features in the design of the communication unit itself as explained in FIGS. 1–6 have made it possible to limit the dimensions of the two cases to airline check-in requirements. Specifically, in the preferred embodiment, the size of each case is 27"×19.5"×13.2", and the mass of each case, including all the communication unit components stowed in it, does not exceed 22 kg. This enables easy manual transportation of the communication unit.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A portable communication unit comprising:
    a) an antenna;
    b) a feed horn and receiver assembly;
    c) an RF transmit electronics assembly; and
    d) a baseband unit contained in a baseband housing;
    wherein said baseband housing has two folding legs, said folding legs, when extended, cooperating with a body of said baseband housing to provide three points of support for said baseband unit; and
    wherein an upper side of said baseband housing includes a rotatable platform, said antenna and said RF electronics assembly removably mounted to said rotatable platform.

2. The communication unit of claim 1, wherein said antenna comprises a plurality of segments removably connected to one another.

3. The communication unit of claim 2, wherein an interface between adjacent ones of said segments defines a zig-zag line.

4. The communication unit of claim 1, wherein said communication unit can be disassembled and stowed in two portable cases.

5. The communication unit of claim 4, wherein said cases are airline-checkable.

6. The communication unit of claim 1, wherein said antenna, said feed horn and receiver assembly and said RF transmit electronics assembly include polarization, azimuth and elevation adjustment mechanisms.

7. The communication unit of claim 1, wherein said antenna, said feed horn and receiver assembly and said RF electronics assembly are removably mounted to said rotatable platform by a quick-connect assembly.

8. The communication unit of claim 1, wherein the baseband unit is suspended within the baseband housing by shock absorbers.

* * * * *